No. 886,943. PATENTED MAY 5, 1908.
T. S. CHEW.
TRAP FOR BATH TUBS.
APPLICATION FILED AUG. 26, 1907.
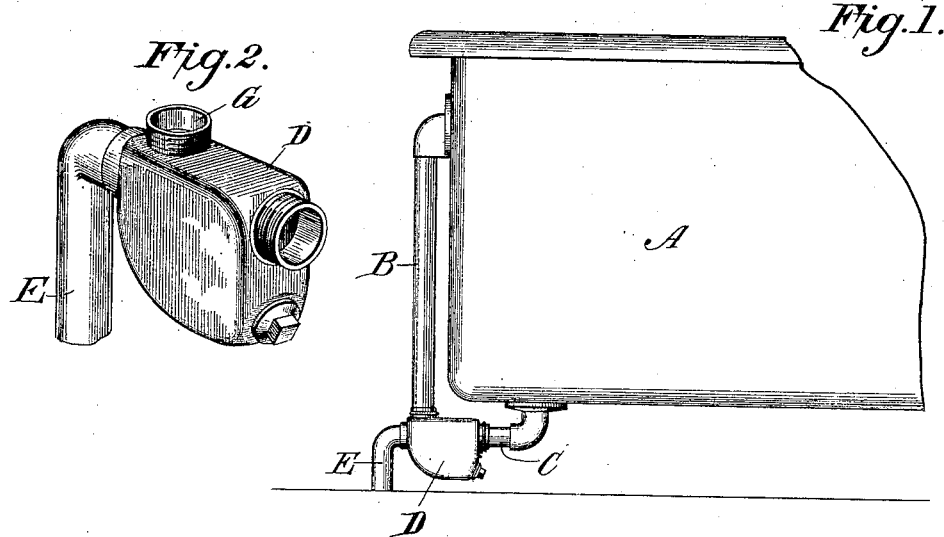
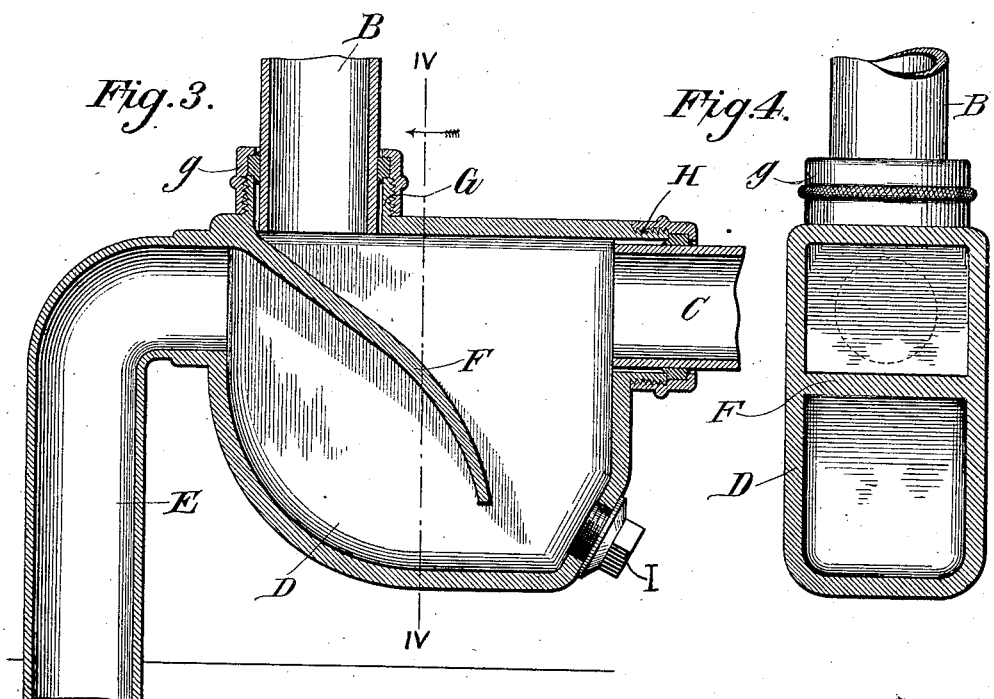

UNITED STATES PATENT OFFICE.

THOMAS S. CHEW, OF ATLANTIC CITY, NEW JERSEY.

TRAP FOR BATH-TUBS.

No. 886,943.  Specification of Letters Patent.  Patented May 5, 1908.

Application filed August 26, 1907. Serial No. 390,205.

*To all whom it may concern:*

Be it known that I, THOMAS S. CHEW, a citizen of the United States, residing at Atlantic City, in the county of Atlantic and State of New Jersey, have invented certain new and useful Improvements in Traps for Bath-Tubs; and I do hereby declare the following to be a full, clear, and exact description of the invention, such as will enable others skilled in the art to which it appertains to make and use the same.

This invention relates to devices for preventing the backward passage of foul air and noxious gases through waste-pipes, and more particularly to a trap attachment for bath-tubs adapted to be applied above the flooring.

The objects of the invention are to provide a simple and efficient device of the character referred to that may be attached to any bath-tub of the usual construction and located above the floor so as to render it accessible for cleansing and to adapt it to be easily removed and replaced and to provide a perfect water-seal and absolute security against the leakage of gas through the joints or couplings for connecting the trap with the discharge and over-flow pipes.

Traps and over-flow pipes of different designs have heretofore been connected with bath-tubs in a variety of ways, the trap being usually located below the flooring on which the bath-tub rests, or when located above the flooring it has been the practice to form in the bottom of the bath-tub an opening or outlet to receive a plate at one end of the trap, where a plug-socket is provided, and to connect one end of the over-flow pipe with the free end or portion of the trap adapted for connection with the waste-pipe, the trap being secured in place by soldering said plate to the metal lining of the tub, thus making the trap a permanent part of the bath-tub bottom, so that it cannot be removed without injury to the tub and is only adapted to be applied to bath-tubs having a specially constructed opening in the bottom and lining thereof for the attachment of the particular kind of trap referred to. Such previously constructed devices are objectionable because of their liability to permit the escape of gases rising in the waste-pipe through the joints connecting the trap with the over-flow and waste-pipes, and by reason of the fact that when the water is discharged a siphonic action is set up which empties the trap and permits the inflow of foul air and gases, and usually the traps are arranged beneath the floor, rendering them inaccessible, without special provision or the necessity of removing a section of the flooring, and when located above the floor the trap requires some special fitting or construction of bath-tub adapted for its attachment.

The invention will first be hereinafter more fully described, with reference to the accompanying drawings, which are to be taken as a part of this specification, and then pointed out in the claims at the end of the description.

In said drawings, Figure 1 represents a side elevation of a portion of a bath-tub with my invention applied thereto. Fig. 2 is a perspective view of a trap attachment embodying my invention. Fig. 3 is a longitudinal sectional elevation of the trap attachment, and Fig. 4 is a vertical sectional elevation of the same, the section being taken on the line IV—IV of Fig. 3.

Referring to the drawings, in which the same reference letters are used to denote corresponding parts in different views, the letter A may denote a bath-tub having an over-flow pipe B and a waste-pipe C connected in the usual manner with openings at one end and in its bottom respectively, and provided with the usual means for closing the upper end of the waste-pipe, the latter and the over-flow pipe being connected at their lower ends with a trap D embodying my invention.

In the form shown, the trap D consists of a box-like structure having vertically disposed sides and ends and a curved bottom which merges into a correspondingly curved portion of one end of said body and is preferably formed integrally with a pipe-section E adapted to extend beneath the flooring, so that there is no joint above the flooring for connecting the discharge pipe with the trap. Said body is also formed or provided with a partition F, which extends downwardly from a point above the mouth of the discharge pipe E to a point near the opposite end and bottom of the hollow body or casting and is preferably curved so as to present a convex surface confronting the inlet from the waste-pipe and a concave surface confronting the curved bottom and side and dividing the body into two compartments of unequal area below the water-line that is, below the line of the outlet or discharge pipe. A circular screw-threaded boss or projection G is provided at or near one end of the trap for connection with the lower end of the overflow pipe B, which may be connected therewith by a slip-joint consisting of a nut $g$ fitting around the pipe B and having an interior shoulder between which and the end of the boss G is placed a rubber or other suitable gasket adapted to be compressed when the nut is screwed up so as to seal the joint. A similar boss H is provided at the front end of the trap for connection with the waste-pipe C, by means of a slip-joint, which may be of the same construction as that already described with reference to the over-flow pipe.

For cleaning the trap a detachable plug I may be provided in its bottom, preferably at the lower front end thereof, as shown. It will be observed that the rear compartment of the trap is oval-shaped with contracted inlet and outlet openings and enlarging therefrom toward the center, and that its capacity below the water-line is considerably greater than the capacity of the front compartment, rendering it impossible for said oval-shaped compartment to be entirely emptied by siphonic action, so that a perfect liquid seal will be maintained, and the entrance of air or foul gases rising from the discharge pipe will be prevented during as well as after the cessation of the out-flow from the bath-tub, and when the out-flow ceases a considerable volume of water will remain within the trap to maintain the seal. It will also be observed that the joints connecting the trap with the over-flow and waste pipes are both located at that side of the partition or liquid-seal which is in direct connection with the bath-tub and that there is no joint on the opposite side or above the flooring, so that it is impossible for foul air and gases rising in the discharge pipe to escape into the room.

It will be understood that while my improvement is especially designed for use with bath-tubs, it may be applied to wash-bowls and other apparatus in which an over-flow pipe and a waste-pipe are employed, and hence I do not desire to be restricted to the particular uses mentioned; and while the described construction is preferred various changes may be made in the form or shape and in the details without departing from the spirit and scope of my invention. For instance, the pipe section E might be joined to the body of the trap otherwise than by forming it integral therewith, and the body of the trap and its inclined partition need not necessarily be made of a single piece or casting, and other means might be employed instead of the slip-joint couplings for detachably connecting the trap with the over-flow pipes, although to adapt the trap to be used in connection with over-flow and waste-pipe sections of different lengths and also to provide for adjustment of the same and to facilitate the attachment of the device and its adjustment to meet different requirements in actual use and to produce satisfactory results, the described construction is preferred.

Having thus described my invention, what I claim as new and desire to secure by Letters Patent of the United States is:

1. A trap for a waste-pipe comprising a narrow hollow body having vertically disposed sides and ends, one end having its lower portion curved toward and merging into a curved bottom, a partition extending downwardly part-way through said body from the upper part of one end toward the lower part of the other end, and having a curved surface confronting the curvature of said curved end bottom, and thus providing an oval-shaped water-space with contracted inlet and outlet at opposite ends of the oval figure, and an approximately triangular water-space at the opposite side of the partition having an opening at each point of intersection of the sides of the triangle, one of the latter openings being the inlet to said oval-shaped water-space and the other two openings being provided with means for attachment to the overflow and waste pipes.

2. A trap for waste-pipes comprising a hollow body adapted for attachment at its top to an over-flow pipe and at one end to a waste-pipe, and having at its opposite end an outlet pipe-section integral therewith, a partition extending part-way across the interior of the hollow body so as to form two compartments, one of approximately triangular form and the other oval-shaped, the latter having an inlet passage at one end and an outlet opening at the other end of the oval figure, and the other compartment having an opening at each point of intersection of the sides of the triangle, one of the latter openings being the inlet to said oval-shaped water-space and the other two openings being adapted for connection with the over-flow and waste-pipes.

3. A trap for waste pipes consisting of a narrow hollow body having front and rear compartments therein with a passage at the bottom, a pipe-connection at one end of said body, a discharge pipe at the other end thereof and another pipe-connection on its top, said pipe-connections leading into said front compartment, and said discharge pipe leading from said rear compartment, the latter compartment being oval-shaped and upwardly inclined from said passage to said discharge pipe.

4. A trap for waste-pipes comprising a hollow body or casting having an inlet opening at its top and a second inlet opening at one end and an outlet opening at the other end, together with slip-joint couplings for connecting said inlet openings with an over-flow and waste-pipe, said body having a downwardly inclined partition therein forming front and rear compartments or chambers with a passage at the bottom, the latter compartment extending upwardly from said passage to said outlet opening and diminishing in size from an intermediate point toward both said passage and outlet and its capacity being considerably greater than that of the front compartment below the line of said outlet.

5. A trap consisting of a narrow hollow body having an inlet pipe-connection at one end and an outlet or discharge pipe at the other end, and an intermediate pipe-connection on its top, said body having a curved partition therein which extends downwardly from its top to a point near its bottom, thus forming front and rear compartments with a passage at the bottom, said bottom and one end of said body being constructed on a curve which is opposed to the curvature of said partition, producing a rear compartment which is approximately oval-shaped and leads upwardly from said passage to said discharge pipe.

6. A trap consisting of a narrow hollow body having a downwardly inclined curved partition therein which extends from its top to a point near its bottom, so as to leave a passage at such point, and having one of its ends and the bottom thereof constructed on a curve which is opposed to the curvature of said partition, thus providing front and rear compartments, the rear compartment being substantially oval-shaped and leading upwardly to a discharge pipe, and the front compartment communicating with pipe-connections for an overflow and waste pipes and leading downwardly to said passage.

In testimony whereof I affix my signature, in presence of two witnesses.

THOMAS S. CHEW.

Witnesses:
  CLARENCE PETTIT,
  WILBERT H. FENTON.